United States Patent [19]

Bernier

[11] 4,232,291

[45] Nov. 4, 1980

[54] ELECTRONIC LOCK, THE CODE OF WHICH CAN EASILY BE MODIFIED BY THE USER

[75] Inventor: Raymond Bernier, Vincennes, France

[73] Assignee: International Detection Protection, France

[21] Appl. No.: 951,412

[22] Filed: Oct. 13, 1978

[30] Foreign Application Priority Data

Oct. 25, 1977 [FR] France ............................ 77 32838

[51] Int. Cl.[2] ...................... H04Q 1/32; E05B 49/00; B60R 25/04; G08B 13/08

[52] U.S. Cl. ............................ 340/147 MD; 340/64; 340/164 R; 340/543; 361/172; 328/61

[58] Field of Search ............... 340/147 MD, 542, 543, 340/64, 149 R, 164 R; 361/172; 328/104, 61

[56] References Cited

U.S. PATENT DOCUMENTS

| | | | |
|---|---|---|---|
| 3,411,046 | 11/1968 | Swannick | 361/172 |
| 3,596,250 | 7/1971 | Sedley | 361/172 X |
| 3,657,658 | 4/1972 | Kubo | 328/104 X |
| 3,717,866 | 2/1973 | Ehrlich | 340/147 MD |
| 3,787,714 | 1/1974 | Resnick et al. | 340/147 MD |
| 4,038,637 | 7/1977 | Peters | 340/147 MD |
| 4,050,063 | 9/1977 | Schull | 340/147 MD |

*Primary Examiner*—Donald J. Yusko
*Attorney, Agent, or Firm*—William A. Drucker

[57] ABSTRACT

An electronic key and lock system. The key unit is plugged in the unit and electrically interconnected therewith only through the leads. Each unit is fitted with a contact strip matrix provided with slots which allow access to the points of intersection of the contact strips from the external face of the unit, the user being provided with conductor pins that can be inserted in the slots so as to set up different combinations. Each unit contains electronic circuits designed to generate (in the case of both the key and the lock) and to detect (in the case of the lock only) a signal in which at least one parameter varies as a function of the established combination, the lock incorporating an electrical power supply for the electronic circuits of both units.

2 Claims, 2 Drawing Figures

ELECTRONIC LOCK, THE CODE OF WHICH CAN EASILY BE MODIFIED BY THE USER

The invention concerns an electronic device consisting of two units, called respectively in what follows a "lock" and "key", that can be electrically interconnected so as to generate a control signal, the lock generating an output, an alarm signal, a locking signal or any other output contributing to security in the event that the key is used by a non authorised person.

An important application of this device is to provide some protection against the theft of motor vehicles. Known anti-theft devices have the disadvantage that the identifying code of whatever type cannot be modified by the user. Perfect protection cannot therefore be provided with regard to the possibility of thieves being able to obtain and decipher the most ingeneous code that it is possible to supply at a reasonable cost.

The invention proposes the construction of a device where the lock and the key are coded, the lock generating a control signal when the two codes are identical and a security signal when they are not the same, the arrangement being such that the key does not need to be provided with a power supply and such that the user can change the code as often as he wishes, a large number of different codes being available, the operation of changing the code being very simple and being effected without the need for any special tools.

According to the invention this result is obtained on providing the lock and key with a contact strip matrix, the intersections of the strips being accessible from the outside of the elements by means of slots, the user being provided with conductor pins that he can insert in such slots in order to establish different combinations, each element containing electronic assemblies designed to generate (in the case of both the key and the lock) and to detect (in the case of the lock only) a signal in which at least one parameter varies as a function of the established combination, the lock incorporating an electrical power supply for the electronic assemblies of both units.

According to a preferred arrangement, the said signal is in the form of a group of pulses that are position coded as a function of the established combination.

Other particular features as well as the advantages of the invention will become evident on reading the following description.

Figure 1:
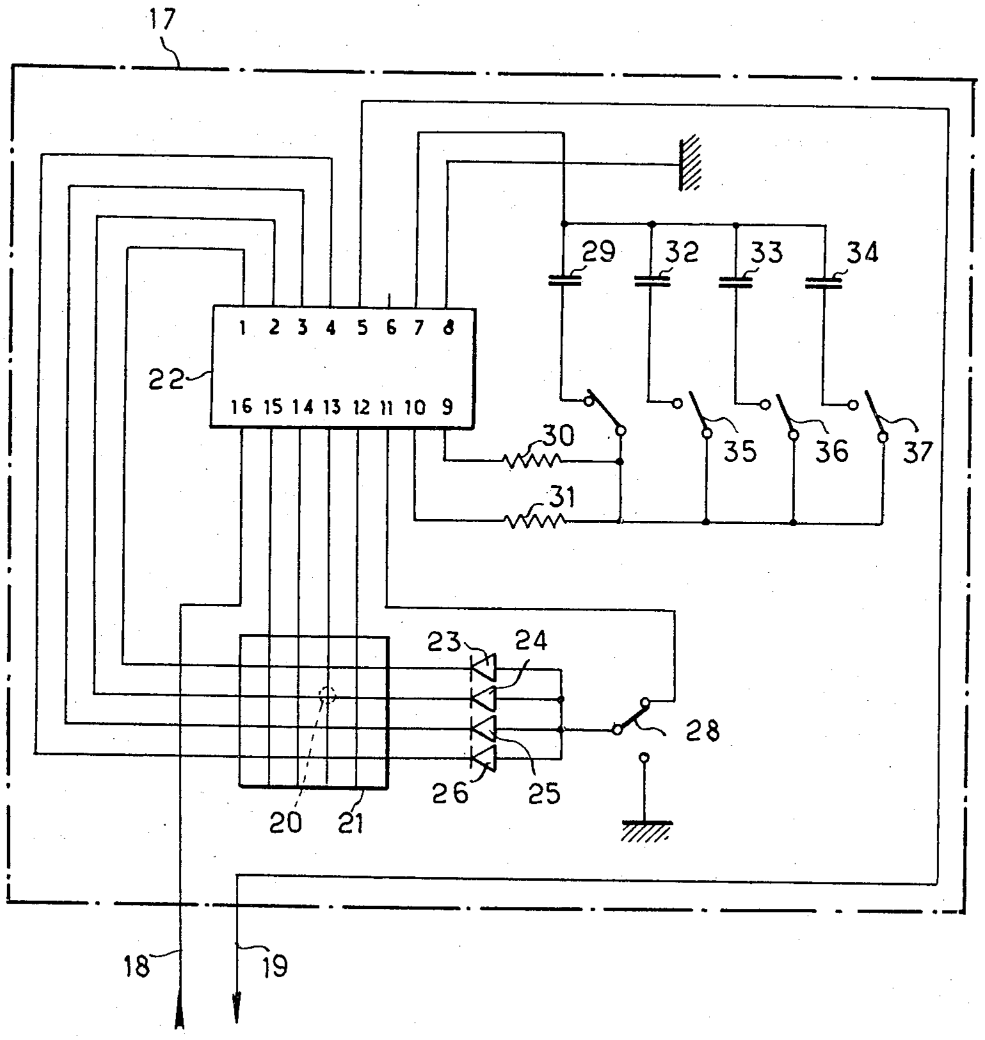
Figure 2:
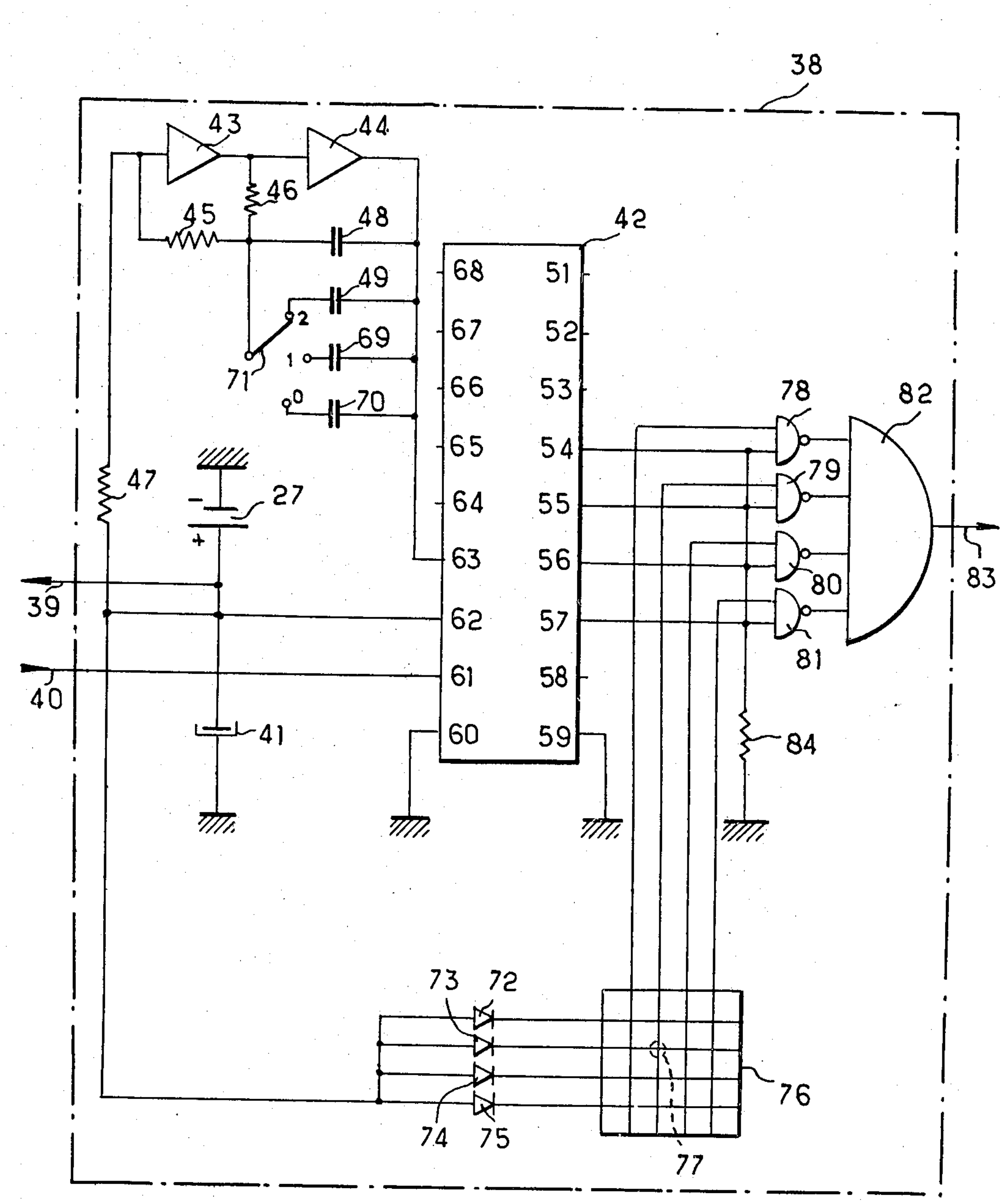

On the attached figures:

FIG. 1 is a schematic diagram of the key according to the preferred arrangement of the invention while FIG. 2 represents the corresponding lock.

The key (FIG. 1) incorporates electronic circuits housed in a box or encapsulated in insulating material 17 and provided with two output terminals 18 and 19 and 16 points of intersection, such as 20, of the contact strip matrix 21. These points of intersection are perceived by the user as an array of 16 slots opening out on to the external face of the box and into which he can insert metal pins. The extremities of the horizontal contact strips to one side of the matrix are respectively connected to the terminals 1, 2, 3 and 4 of the integrated circuit 22 which generates the coded pulse signal as explained below. At the other side of the matrix the extremities of the horizontal contact strips are connected via the respective diodes 23 to 26 and via the switch 28, either to earth or to terminal 11 of the circuit 23.

The upper extremities of the vertical contact strips of the matrix are connected respectively to terminals 12 to 15 of the circuit 22. The external terminal 18 and terminal 16 of the circuit 22 are interconnected. Terminal 5 of the circuit 22 is connected to the external terminal 19. Terminal 8 is connected to earth. Terminal 7 is connected to terminal 9 via the series connected capacitor 29 and resistance 30 and to terminal 10 via the series connected capacitor 29 and resistance 31. The capacitors 32, 33 and 34 can each be connected in parallel with capacitor 29 by means of the respective switches 35, 36 and 37.

In practice the four switches 28, 35, 36 and 37 are constructed in the form of a connector block provided with slots opening out on to the external face of the box 17 into which the user can insert metal pins. The connector strip matrix 21 and the connector block can usefully be constructed as described in the French patent deposited on the Oct. 19, 1977 by the same depositor and entitled: "Electrical contact device incorporating spiral springs mating with conductor pins".

The integrated circuit 22 can consist, for example, of the commercially available item made by the R.T.C. company and bearing the reference No. SAF 1031 P. Such a circuit includes a pulse code modulated oscillator, the frequency of which can be set respectively to any one of four different values by the opening of all three switches 35, 36 and 37, by the closing of switch 35 only, the closing of switch 36 only and finally by the closing of switch 37 only.

The circuit 22 also includes a circuit which determines the code word, i.e. the presence or absence of pulses in the group of pulses generated by the oscillator, as a function of the interconnection of the input terminals provided by the matrix or to be more precise as a function of the interconnection established as a result of the user inserting a single pin according to his own arbitrary choice at any one of the 16 intersections of the matrix. The oscillator then starts to operate so as to generate a specific code word which appears at the output terminal 19. If pins are inserted simultaneously at two intersection points or in the absence of any insertion the circuit arrangement is such that the oscillator ceases to operate. Operation of switch 28 allows the number of different coding combinations to be multiplied by 2 so that the described key is capable of providing $16 \times 2 \times 4 = 128$ different combinations.

It should be understood that this is by no means the maximum number of combinations that can be provided since this type of circuit can readily be adapted to provide a much larger number of combinations.

The lock (FIG. 2) consists of a number of electronic circuits housed in a box 38 and connected to two external terminals 39 and 40. Terminal 39 is connected to the point of interconnection between the d.c. power supply 27 and the capacitor 41 and also to terminal 62 of the integrated circuit 42, the function of this latter being described below. Terminal 40 is connected to terminal 61 of this integrated circuit.

Terminal 63 is connected to a reference signal generator consisting of two operational amplifiers functioning as an oscillator, the three resistances 45, 46 and 47 and the four capacitors 48, 49, 69 and 70. The point of interconnection between the two resistors 45 and 46 can be connected to any one of the capacitors 49, 69 or 70 by means of the switch 71, this switch accordingly serving to set the frequency of the reference signal to any one of four different pre-determined values.

The positive terminal of the power supply is connected via diodes 72 to 75 to the extremities of the four horizontal contact strips to one side of the contact strip matrix 76, this matrix having a total of 16 points of intersection such as 77. The upper extremities of the vertical contact strips are connected respectively to one of the inputs of the four AND gates 78 to 81, the outputs of these gates being connected in turn to the input of the gate 82. The output of the AND gate 82 goes to the external terminal 83. The other inputs of the gates 78 to 81 are connected respectively to terminals 54 to 57 of the circuit 42 and also to earth via the resistance 84.

The contact strip matrix 76 and the switch 71 can usefully be constructed as described above for the corresponding components of the key. The user must of course insert the conductor pins so as to set up the same code for both the lock and the key. When this is done, the key being inserted into the lock (such that terminal 16 of FIG. 1 is connected to terminal 39 of FIG. 2 and terminal 19 of FIG. 1 to terminal 40 of FIG. 2), it is energised by the power supply 27 located in the lock and it transmits a group of coded pulses to the lock which will normally be decoded by this latter. If on the contrary the codes set up in the lock and the key respectively are not the same then the lock will not decode the signal. In the described method of operation, the first case results in the appearance of a logic level 1 at terminal 83 and the second case by the appearance of a logic level 0 at this same terminal, the logic level 1 being processed by circuits not illustrated on the figures so as to serve as an operating signal for a control gate while logic level 0 serves as a security signal (locking of control gate and operation of an alarm).

The integrated circuit 42 can usefully consist of a commercially available item made by the R.T.C. company and bearing the reference No. SAF 1032 P. Such a circuit includes shift registers capable of storing the groups of pulses supplied by the key and a repetitive comparator which converts the serially transmitted information into a parallel logic signal, i.e., into a combination of 0 and 1 logic levels at the four outputs terminals 54 to 57. It should be understood that if the signal frequency of the key does not correspond to the frequency of the reference signal provided by the lock then the pulse detection does not take place and there will then be a logic 0 level at all output terminals 54 to 57 and hence the same logic 0 level at terminal 83. The contact strip matrix 76 provides a combination of four logic levels at the inputs of the gates 78 to 81 in accordance with code set up for the lock and the gates will all be open only on condition that this combination is the same as that detected by circuit 42.

It is only under these conditions that a logic 1 level appears at terminal 83.

It should be understood that other logic circuits able to generate a group of coded pulses and to receive and identify such a group can be assembled by a competent engineer without departing from the spirit of the invention. The use of a number of different frequencies is not an essential feature. In general all electronic circuits serving to code a signal by means of a contact strip matrix can be employed but those relying for their operation on coded pulses are particularly reliable and easy to construct.

The lock, when intended for installation on a motor vehicle, should not of course be accessible except for the slots into which the coding pins are inserted.

The following arrangement can be adopted to ensure that these slots are only accessible to an authorised user of the vehicle.

The coding elements of the lock can be in the form of a detachable block connected to the remaining circuits in the lock and which can be arranged to have the same external appearance as the key. The user can remove this block on leaving the vehicle for any long period of time (e.g. when the vehicle is being repaired). He can readily code this block at the same time as the key so as to avoid any error. The coded block can then be connected to the fixed circuits of the lock.

We claim:

1. An electronic lock and key system for generating latch actuating and security signals, comprising: a lock circuit unit; a detachable key circuit unit; means for establishing a removable electrical connection between the key circuit unit and the lock circuit unit; each circuit unit including externally accessible and programmable contact matrix means each establishing a specific code; the key circuit unit comprising pulse code modulated oscillator means having a plurality of control terminals connected to the key contact matrix means and a signal output on which pulses coded according to a key code are sequentially transmitted; the lock circuit unit comprising shift-register means converting the said sequentially transmitted coded pulses into a parallel logic signal and gating means, having a plurality of control inputs connected to the lock contact matrix means, said gating means being connected to the shift register means and comparing the said parallel logic signal to the lock code programmed on the lock contact matrix means, said gating means having an output on which a latch actuating signal is generated each time the said lock code and the said parallel logic signal coincide and a security signal each time the said lock code and the said parallel logic signal do not coincide, the said means for establishing a removable electrical connection essentially consisting of a power supply lead and a signal transmitting lead, the signal transmitting lead connecting the signal output of the said oscillator means to the said shift-register means.

2. An electronic lock and key system as claimed in claim 1, wherein the key circuit unit further comprises switch control means externally operable coupled to said oscillator means, for selecting the frequency of said oscillator means among a plurality of predetermined values and the lock circuit unit further comprises: further oscillator means for generating a plurality of reference frequency signals; externally operable switch control means, coupled to said further oscillator means, for selecting the frequency of said further oscillator means among a plurality of predetermined values; means for comparing the operating frequencies of the oscillator means and of the further oscillator means and means for inhibiting the operation of the shift-register means each time the said operating frequencies are not identical.

* * * * *